United States Patent [19]

Rege

[11] 4,088,876
[45] May 9, 1978

[54] ERROR CORRECTING CIRCUITS AND METHODS FOR SHIFT REGISTER TYPE MEMORIES

[75] Inventor: Satish Laxmanrao Rege, Somerset, N.J.

[73] Assignee: Burroughs Corporation, Detroit, Mich.

[21] Appl. No.: 751,597

[22] Filed: Dec. 17, 1976

[51] Int. Cl.² ............................................. G11C 29/00
[52] U.S. Cl. ...................................... 235/312; 365/77
[58] Field of Search ...................... 235/153 AM, 312; 340/146.1 AG, 146.1 AL, 174 ED; 365/77, 73, 200

[56] References Cited

U.S. PATENT DOCUMENTS

| | | | |
|---|---|---|---|
| 3,792,450 | 2/1974 | Bogar et al. | 340/174 ED |
| 3,794,819 | 2/1974 | Berding | 235/153 AM |
| 4,024,509 | 5/1977 | Elmer | 235/153 AM |
| 4,028,539 | 6/1977 | Jacobs | 235/153 AM |

Primary Examiner—Charles E. Atkinson
Attorney, Agent, or Firm—Mervyn L. Young; Kevin R. Peterson

[57] ABSTRACT

This disclosure relates to error correcting circuits and methods employed thereby for shift register type memories which are formed of a plurality of loops that may be accessed in parallel. Such circuitry is designed to detect when the output of a given loop or shift register becomes a series of ones or a series of zeros which conditions indicate burst mode error. The data bit corresponding to the loop or shift register producing the error is then corrected by complementation.

9 Claims, 10 Drawing Figures

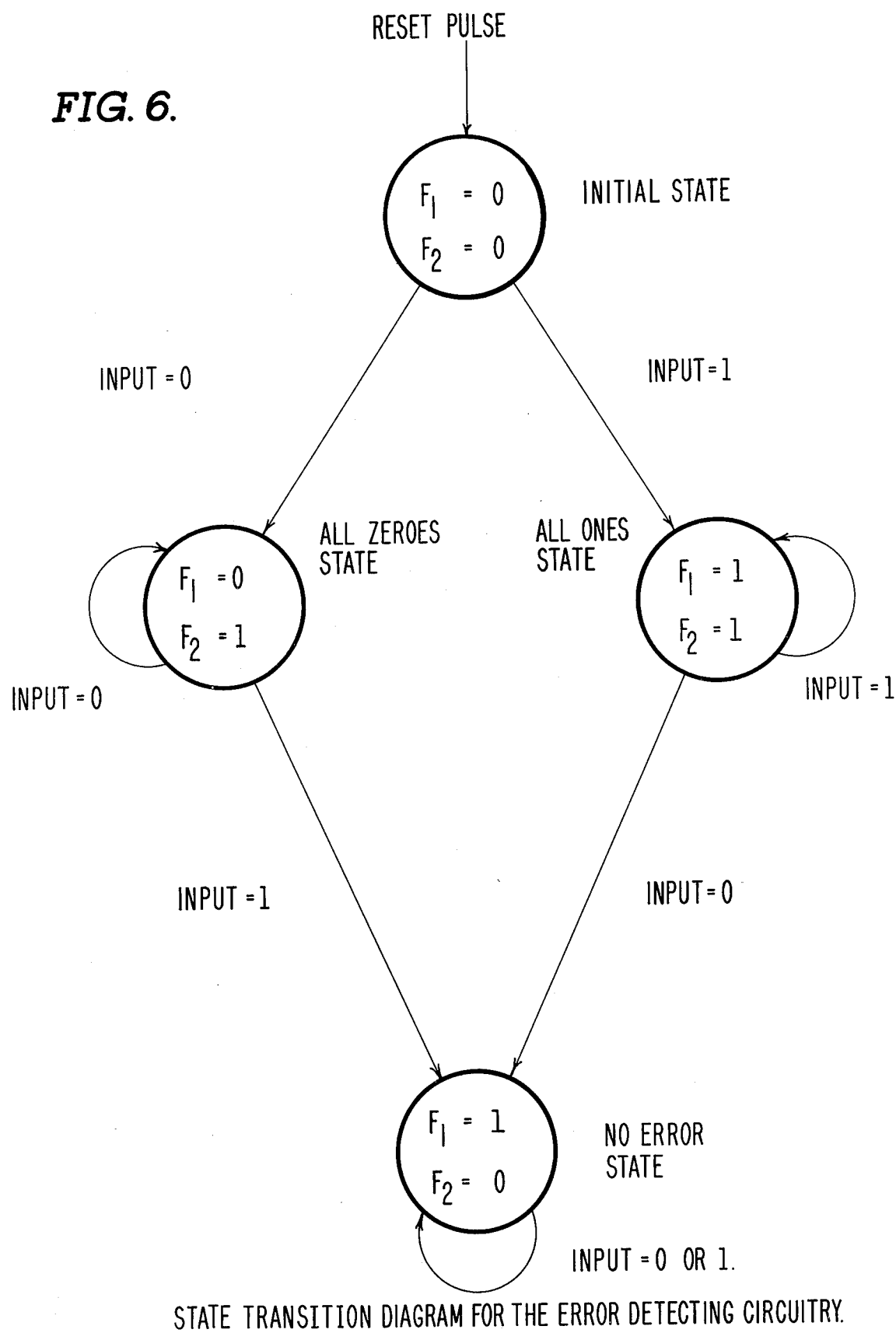

ERROR CORRECTING CIRCUITS AND METHODS FOR SHIFT REGISTER TYPE MEMORIES

BACKGROUND OF THE INVENTION

1. Field of the Invention

This invention relates to error detection and correction circuitry and the method employed thereby and more particularly to such circuitry and method for employment with shift register type memories.

2. Description of the Prior Art

The trend of memory organizations toward serial recirculating memories is increasing, not only because of the flexibility residing therein for storing variable length word sizes, but also because of the low costs resulting from minimal access and other overhead circuitry and also because of new component development. Thus, further memory systems particularly for bulk memories are anticipated to be formed of charge coupled devices (CCD) and magnetic bubble memories (magnetic domain memories) as well as MOS shift registers. In order to increase the storage capacity of such serial dynamic memories, a plurality of recirculating loops are provided when the data bits can only be accessed at fixed locations in the loops.

In order to increase the reliability of large memory systems, different error detection and error correction methods have been proposed and are described in the prior art. See, for example. R. T. Chien, "Memory Error Control; Beyond Parity," IEEE Spectrum, July 1973, pages 18-23. Among the more common of these methods have been parity check methods for random access memories such as cores and RAM semiconductor memories, and also cyclic redundancy codes (CRC) for serial memories (long shift registers) such as disks, drums and tapes.

Hamming codes have been commonly used to detect and correct errors. Information bits are appended with some code bits and are stored in the memory unit. When the information is retrieved, it is checked for being a code word. If the data is not a code word, then the minimum distance decoding is used for error correction.

Single bit parity, a degenerate case of Hamming code, can detect all single errors and some multiple errors. The value of the parity bit is determined to be zero or one depending on the number of zeros and ones in the information bits and whether even or odd parity is used. By using more than one bit to represent parity, multiple error detection and/or multiple error correction is possible. For multiple error detection, static and dynamic J-out-of-N checkers have been employed in the prior art. In all of these methods the costs in terms of the number of extra bits required for parity increases with increases in the number of errors to be detected and/or corrected.

It is desirable to increase the error correcting capability of a memory system without adding any extra bits to the memory and by using a minimal amount of extra logic. For example, a Hamming code capable of detecting and correcting "e" bit errors and detecting "e plus 1" bit errors can be upgraded to detect and correct "e plus 1" bit errors when such errors are of a burst mode type.

Predictions have been made that the most defects in shift register type memories, such as CCD's and magnetic bubble devices, will be such that all the bits in a given shift register are affected. Therefore, when a fault exists and a shift register affected by that fault is accessed, then burst error occurs. If the register is recirculated through enough cycles, then the error will propagate to all the bits in the shift register. Thus, a burst error equal to the shift register size is encountered. This error may generate all ones or all zeroes. It is expected that a large number of errors occurring in memory systems built with such recirculating memory devices will be of the burst error type.

It is then an object of the present invention to provide an improved error correcting circuit and method for a recirculating memory.

It is another object of the present invention to provide a more reliable and inexpensive error correcting circuit and method.

It is still another object of the present invention to provide an improved error correcting circuitry and method without requiring that extra bits be added to the existing error correction means and data segments.

SUMMARY OF THE INVENTION

In order to accomplish the above described objects, the present invention resides in error correcting circuitry for a recirculating memory which is formed of a plurality of loops or shift registers that are to be accessed in parallel. The error detection circuitry is designed to detect when the output of a given loop or shift register becomes a series of ones or a series of zeros. When this occurs in any given loop or shift register, it is then known that there is a high probability of an error in that loop or shift register and the corresponding bits in the data segment being accessed can be corrected by complementing the appropriate error bits.

Therefore, the present invention resides in a recirculating memory having a plurality of recirculating data paths and error correcting means coupled to each data path externally to detect when the output from that data path is either a series of one bits or a series of zero bits.

DESCRIPTION OF THE DRAWINGS

The above and other objects, advantages and features of the present invention will become more readily apparent from a review of the following specification taken in conjunction with the drawings wherein:

FIG. 6 is a state diagram for the circuitry of FIG. 5.

GENERAL DESCRIPTION OF THE INVENTION

The present invention is directed toward error detection and correction for recirculating memories formed of a plurality of loops which are word accessed in parallel. To this end, both parity checking is provided in order to detect the occurrence of an error and a plurality of burst mode error detection circuits are provided, one for each loop being accessed in parallel. Once a burst error is detected then one or more bits in the accessed word can be complemented to correct the error.

Figure 1:
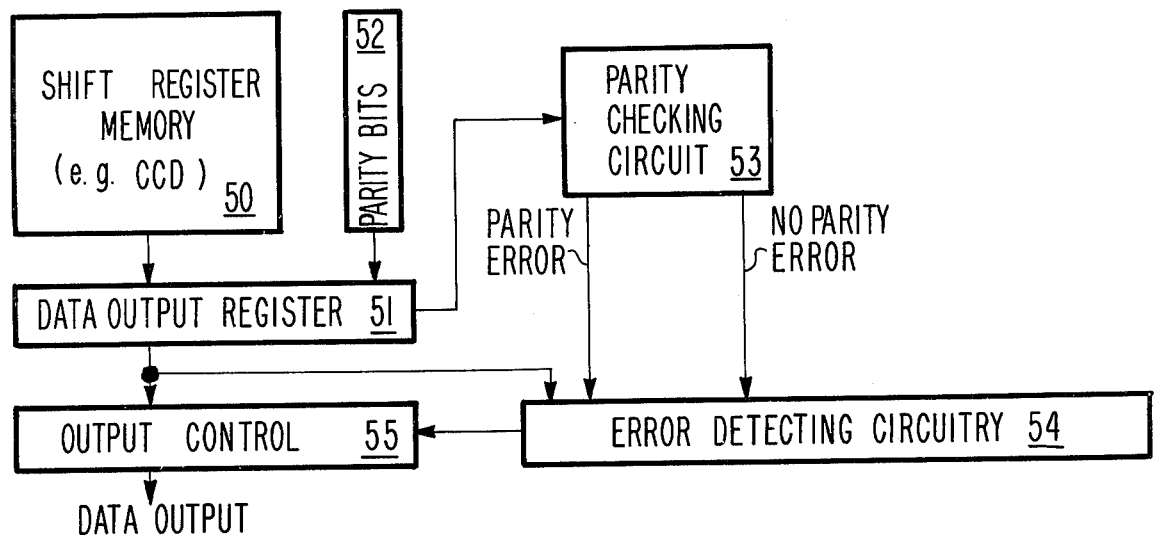
FIG. 1 is a block diagram of a memory system employing the error detecting and correcting logic of the present invention.

The organization of a system employing the present invention is illustrated in FIG. 1 wherein a plural loop shift register memory 50 is coupled to a data output register 51 to which it provides a series of data bits in parallel. Also provided at that time to the data output register 51 is a parity bit from an extra storage loop 52. A parity check of the outputted data bits is made by parity checking circuitry 53 while the contents of data output register 51 are transferred to output control unit 55. Output control unit 55 contains a true/false register (not shown) and control logic to complement any given data bit in the true/false register once it is determined that an error has occurred and exists at that given data bit. If a parity error has been detected by parity checking circuit 53, then burst mode error detection is provided for all of the storage loops by error detecting circuitry 54 which consists of a plurality of burst mode error detecting circuits that will be described below. Once it has been determined that a particular loop has provided burst mode error, then the control logic and output control unit 55 is activated to complement those bits in the true/false register in output control unit 55 which contains the word that has been accessed from the shift register memory 50.

Figure 2A:
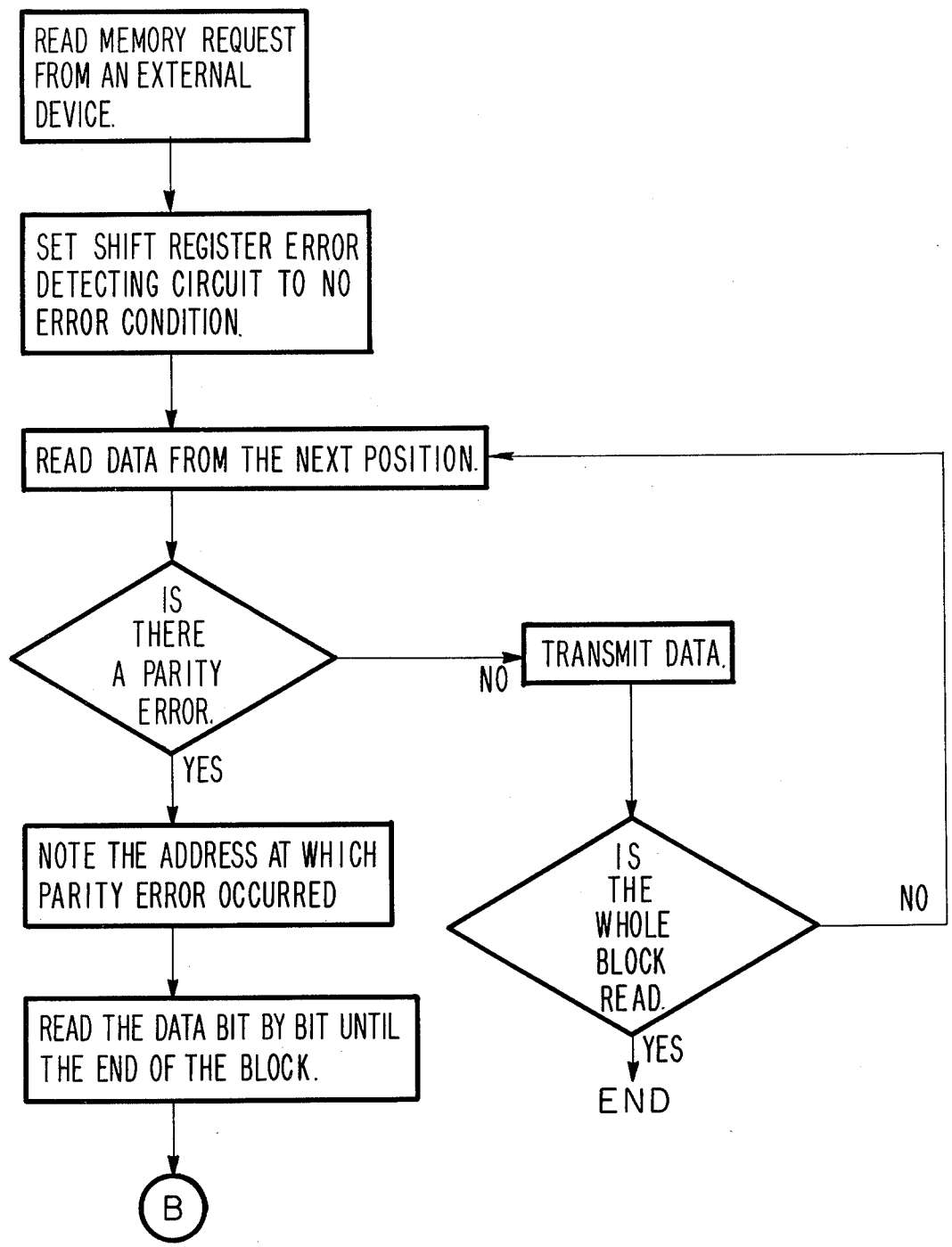
FIGS. 2A and 2B are flow charts illustrating the method of operation employed by the present invention.
Figure 2B:
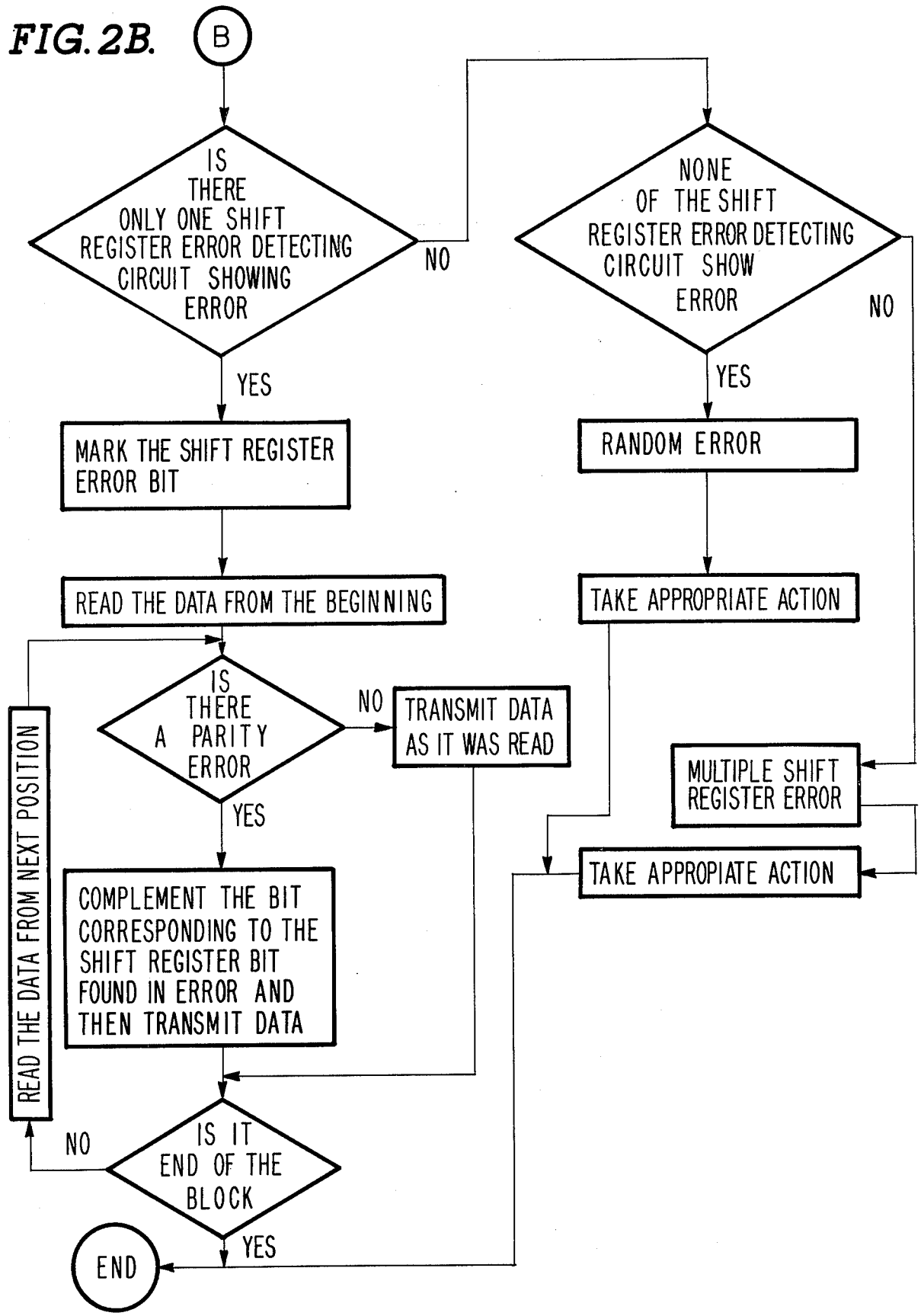

The sequence in which the various steps are performed by a system of the present invention is illustrated in FIGS. 2A and 2B. As shown in FIG. 2A, when a read memory request is received from an external device, the shift register error detecting circuitry 54 of FIG. 1 is set to a no error condition. A date word is accessed from the next position in the shift register memory. If there is no parity error, the data word is transmitted to the requesting device and the data read operation is continued until the entire block of data words, that have been requested, have been read out of the memory. If a parity error occurs, the address at which the parity error occurred is noted, and each of the respective storage loops is then read out bit by bit until the end of the block is reached. Referring now to FIG. 2B, the respective error detecting circuits are checked to determine if only one detecting circuit shows an error. If more than one error detecting circuit has shown a burst error, this is noted. If none of the shift register error detecting circuits shows an error, then the parity error that was detected is treated as a random error and the data word for which the parity error was noted is again read out of the memory.

If only one shift register error detecting circuit has detected an error, the particular shift register error bit is noted and the memory is then accessed from the data word therein at which the memory was being accessed when the first parity error was detected. If there is no parity error during this access, then the data is transmitted to the output control unit 55 of FIG. 1 and from there to the requesting device. If a parity error is again detected, the bit corresponding to the shift register error circuit is complemented and the work is transmitted to the requesting device. The procedure is then reentered and repeated until the end of the data block has been reached.

DETAILED DESCRIPTION OF THE INVENTION

Figure 3:
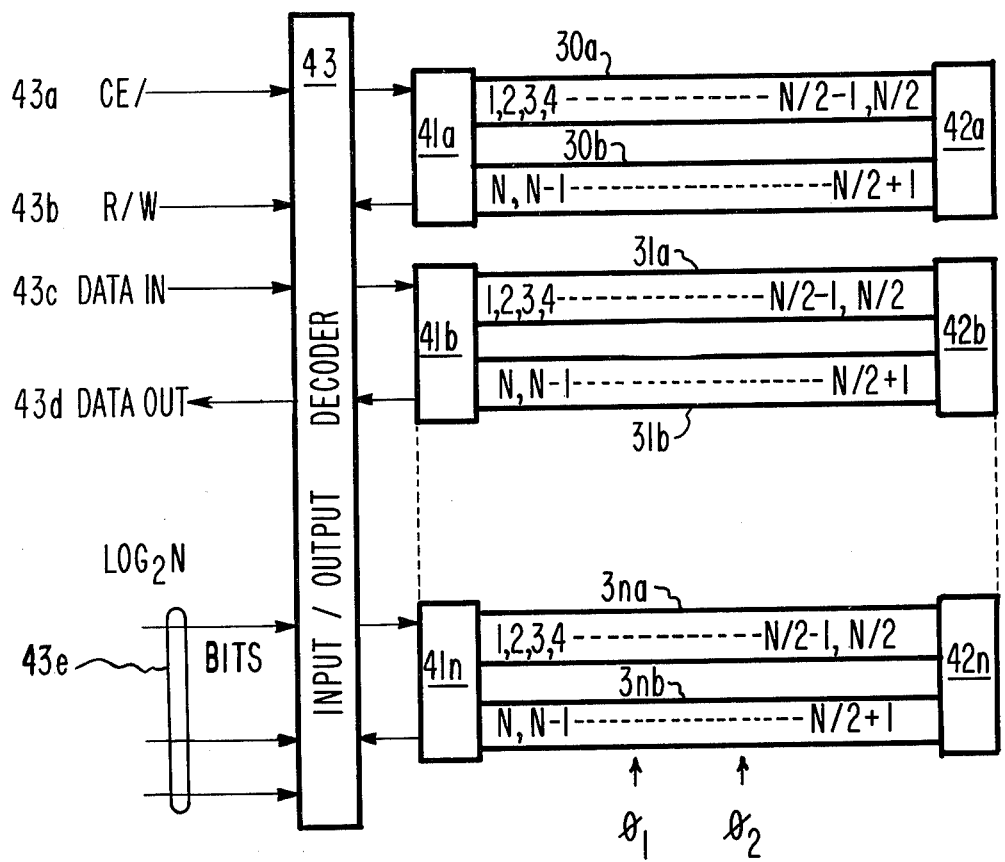
FIG. 3 is a schematic representation of a CCD memory organization such as employed in the present invention.

A serial shift register type memory designed for parallel accessing is illustrated generally in FIG. 3. As shown therein, a plurality of pairs of shift registers 30a, 30b; 31a, 31b; . . . 3na, 3nb are coupled together to form a plurality of recirculating loops. This coupling is provided by a plurality of regeneration amplifiers 41a, . . . , 41n and 42a, . . . , 42n so that data bits can be recirculated. As indicated in FIG. 3, data bits forming a word for parallel accessing are synchronized so that all the bits representing one word can be presented out at the same time to input/output decoder 43. The external inputs to input/output decoder 43 include enable line 43a, read/write line 43b, data in bus 43c, data out bus 43d, and address lines 43e. In order to access, in parallel, a word stored in the shift register array, input/output decoder 43 is provided with an external counter (not shown) which is in synchronism with the recirculation of the various words in the array.

Figure 4A:
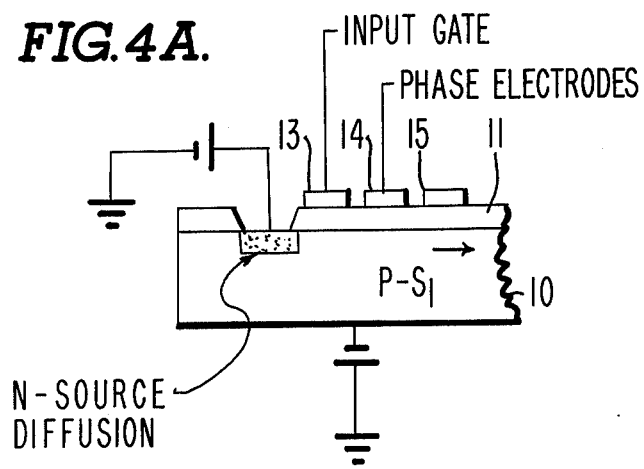
FIGS. 4A-D are cross sectional and schematic representations of CCD memory structures such as may be employed with the present invention.

While the detection and correction circuitry of the present invention is designed to operate with any type of shift register array such as MOS shift registers, bubble memories, and charge coupled devices (CCD's), the preferred embodiment of the present invention employs CCD's memory structures. A brief description of CCD memory structures will now be provided with reference to FIGS. 4A-D. FIG. 4A illustrates one type of memory structure as well as one of the methods by which signals are inputted to that structure. The memory structure is formed of a silicon substrate 10 having an oxide insulator layer 11 adjacent to which a number of storage gates or electrodes such as 14 and 15 are positioned. Electrodes 14 and 15 serve to form capacitors with substrate 10 which hold charge packets that may be transferred from one electrode to the next as the respective electrodes are energized in phases. Input signals are supplied to input gate 13 to establish a voltage that causes carrier injection from source diffusion area 12 which is an area of substrate 10 that is highly diffused with the impurity atoms of opposite polarity.

Figure 4B:
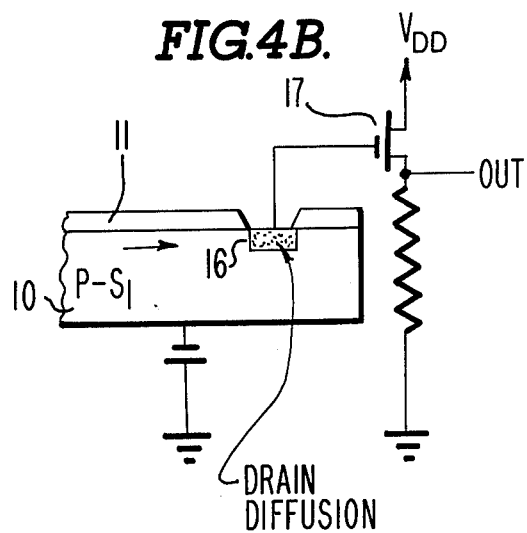

FIG. 4B illustrates part of the method by which charges are detected and read out of the memory. It will be understood that a number of storage gates are placed adjacent to oxide layer 11 and charge packets are received from the last of such storage gates by drain diffusion area 16 to activate output gate transistor 17.

Figure 4C:
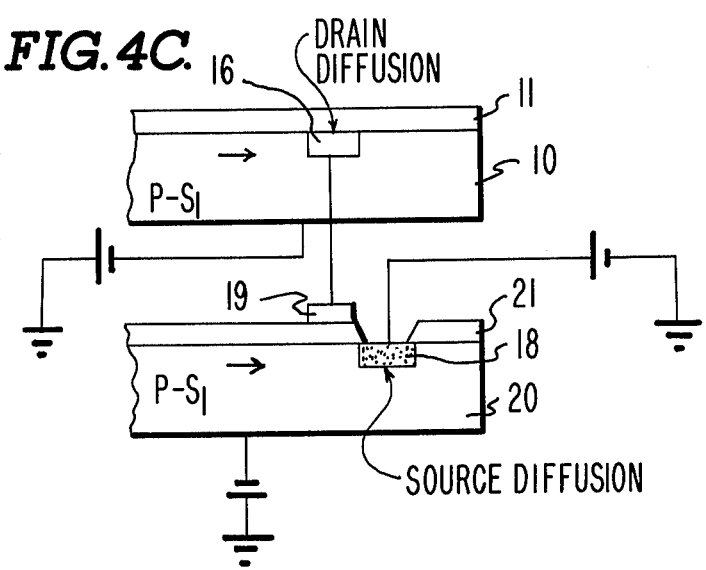

The manner in which the storage signals are detected and transferred from one storage track to the next to form a storage loop is disclosed in FIG. 4C. As illustrated therein, the detection of the reception of a charge packet by drain diffusion area 16 transmits a signal impulse to input gate 19 to initiate carrier injection from source diffusion area 18, it being understood that there are a number of storage gates provided adjacent to the oxide layer 21 and substrate 20 of the second storage track.

Figure 4D:
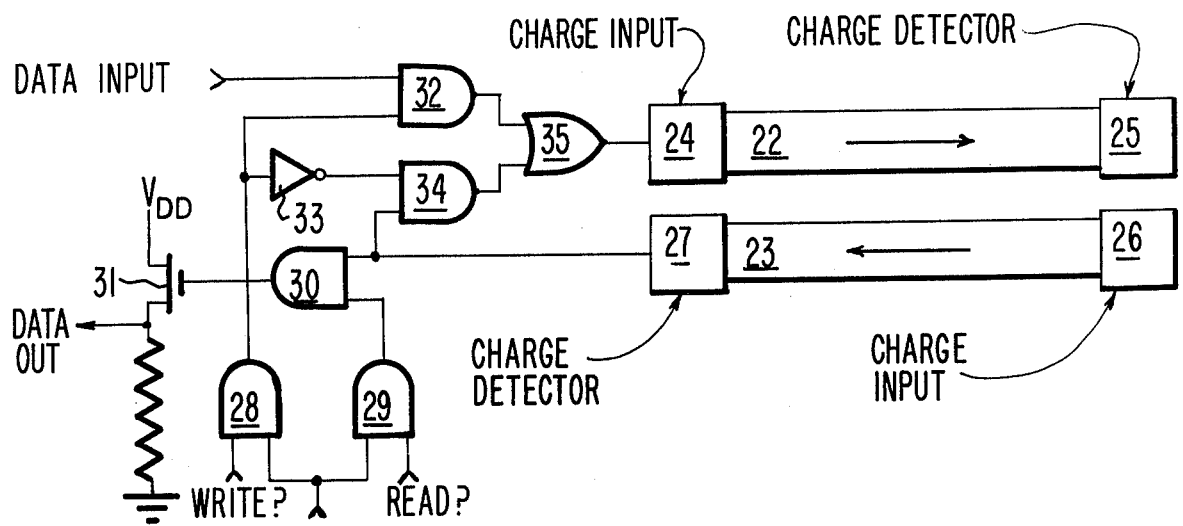

The manner in which a complete storage loop can be formed from structures of FIGS 4A-C, may be described in relation to FIG. 4D. As illustrated therein, an input signal is received by AND gate 32 and transmitted therefrom, upon the presence of a write signal from AND gate 28, to the input gate 24 of the memory via OR gate 35. The input signals cause charge packets to be transferred along storage track 22 as was described above in relation to FIG. 4A. When the charge packets reach the end of storage track 22 they are detected by charge detector 25 and transferred to charge input 26 of storage track 23 as was described above in relation to FIG. 4C. When the charge packets have been transferred the length of storage track 23, they are detected by charge detector 27 and would normally cause signals to be sent back to charge input gate 24 of track 22 via AND gate 34 and OR gate 35 where AND gate 34 is normally supplied with a positive signal by inverter 33 unless a write signal is received from AND gate 28. Thus, the storage loop is completed. When it is desired to read out of the storage loop, a read signal is transmitted by AND gate 29 to AND gate 30 so as to transmit the data to transistor gate 31.

Figure 5:
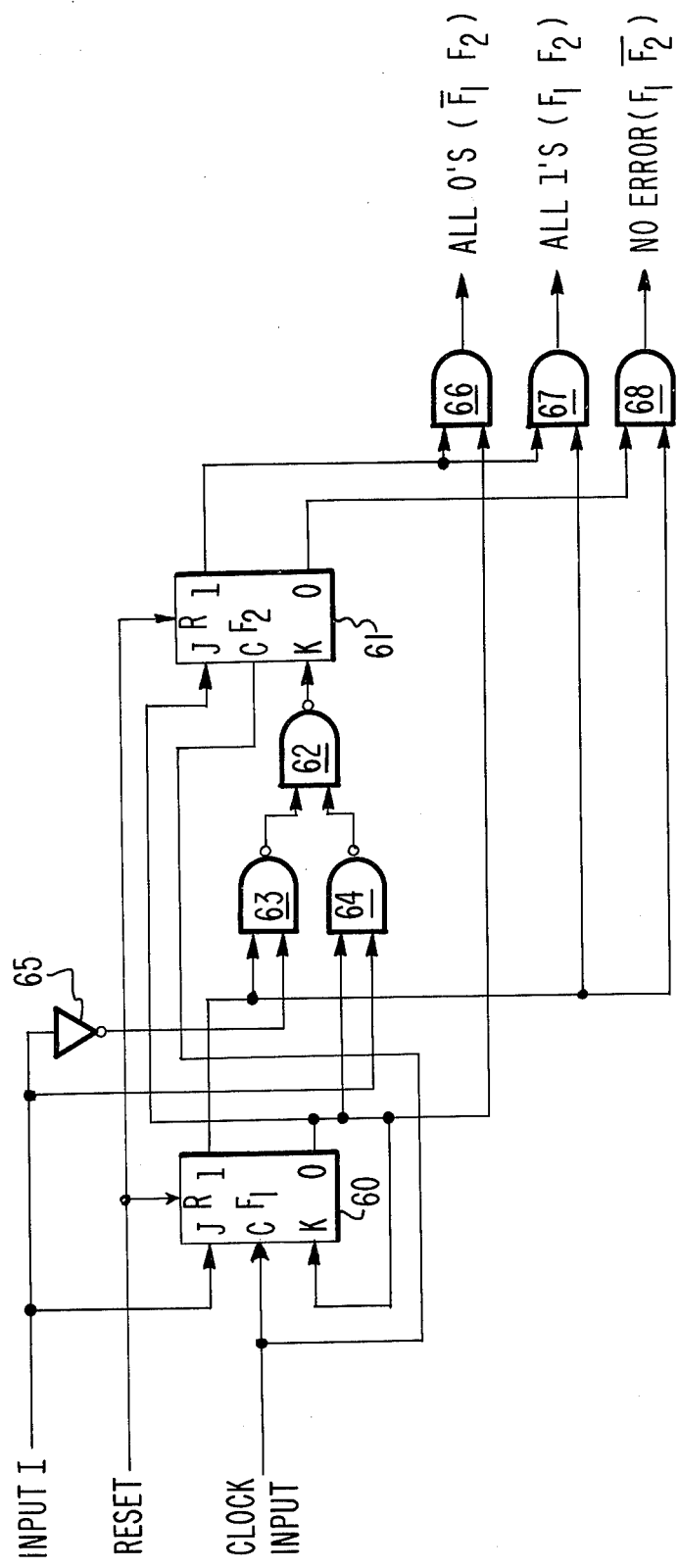
FIG. 5 is a schematic diagram of error detecting circuitry as employed in the present invention.

An error detecting circuit such as employed in the present invention is illustrated in FIG. 5. It will be remembered that a plurality of such circuits are provided, one for each storage loop or, more precisely, for each bit position in output register 51 of FIG. 3. The error detecting circuitry may be easily explained by using the state transition diagram in FIG. 6. The circuitry has four states: (1) Initial State ($F_1 = 0$, $F_2 = 0$), (2) All Zero's State ($F_1 = 0$, $F_2 = 1$), (3) All One's State ($F_1 = 1$, $F_2 = 1$), and (4) No Error State ($F_1 = 1$, $F_2 = 0$). Before beginning the access of the memory system a reset pulse initializes the error detecting circuitry to the Initial State. The occurrence of a first zero at the input evokes a state transition and puts the error detecting circuitry in the All Zero State. The error detecting circuitry remains in the All Zero's State until a one is sensed at the input, when it is put into No Error State. Subsequent occurrences of zeros or ones keeps the error detecting circuitry in the No Error State until a reset pulse puts it into the Initial State. If the first input after the reset pulse is a one then the error detecting circuitry is put into All One's State and remains in this state until a zero occurs. An occurrence of zero evokes a state transition and puts the circuit in the No Error State.

In FIG. 5, the circuitry comprises J-K flip-flops 60 and 61. A high input signal will set flip-flop 60 to its "one" state. If no high signal is received as an input, flip-flop 61 will be set to its "one" state by a high "zero" output from flip-flop 60. Flip-flop 61 will be set to its "zero" state only when two high signals are supplied to NAND gate 62 from corresponding NAND gates 63 and 64. NAND gate 63 is supplied with signals from the "one" output of flip-flop 60 and an inverted input signal via inverter 65. NAND gate 64 is supplied with signals from "zero" output of flip-flop 60 and the incoming input signal. The output gate 66 is supplied with signals from the "one" output of flip-flop 61 and the "zero" output of flip-flop 60. AND gate 67 is supplied by the "one" output of flip-flop 61 and the "one" output of flip-flop 60. AND gate 68 is supplied by signals from the "zero" output of flip-flop 61 and the "one" output of flip-flop 60. In this manner, if the accessing of given storage loop produces a burst of "zero" signals, gate 66 will register a one. Similarly, if the read out from a given storage loop produces a burst of "ones," gate 67 will register a one. If there has not been any burst mode error, then gate 68 will register a one. Signals representing the various states of these gates are then transmitted to output-control unit 55 of FIG. 3.

EPILOGUE

As has been described above, the present invention is directed toward a recirculating dynamic memory system employing dynamic shift registers and also error detecting and correcting circuitry which is inexpensive and does not require the addition of extra bits to the data words. Various types of memory elements may be employed with the present invention including bubble memories, charge couple devices and MOS shift registers. The memory system is partitioned into a number of parallel recirculating loops that may be word accessed in parallel. Each recirculating loop is provided with detection circuitry to detect burst mode errors and, once a particular loop has been identified as having an error, the particular bit in the accessed word can be corrected by complementing.

While one embodiment of the present invention has been disclosed, it will be understood by those skilled in the art that various modifications and variations may be employed without departing from the spirit and the scope of the invention as claimed.

What is claimed is:

1. A recirculating memory system comprising:
   a plurality of recirculating data paths in which sets of related data bits, one bit in each of the respective paths, are recirculated in synchronism;
   means coupled to the respective recirculating data paths to access a set of related bits in parallel; and
   a plurality of error detecting circuits, one for each recirculating data path and coupled to said accessing means to detect when the bits accessed from a given data path are a series of ones or a series of zeros.

2. A recirculating memory system according to claim 1 which further includes:
   a recirculating parity data path in parallel with said plurality of recirculating data paths and containing a series of parity bits one for each set of related data bits in said recirculating data paths; and
   parity checking means coupled to said accessing means and to said recirculating parity data path to check the parity of an accessed set of related data bits.

3. A recirculating memory system according to claim 1 wherein:
   said recirculating data paths are formed of MOS shift registers which are coupled together to form a plurality of recirculating loops.

4. A recirculating memory system according to claim 1 wherein:
   said recirculating data paths are formed of charge coupled devices.

5. A recirculating memory system according to claim 1 wherein:
   said recirculating data paths are formed in a magnetic medium having a magnetic bias to sustain single domain walls as individual data bits.

6. A recirculating memory system according to claim 1 further including:
   complementing means coupled to said accessing means to complement a given bit accessed from a recirculating data path when a corresponding error detecting circuit detects a series of ones or a series of zeros having been accessed from that data path.

7. In a recirculating memory system having a plurality of recirculating data paths wherein sets of related data bits, one from each data path, are recirculated in synchronism, accessing means coupled to each of said recirculating data paths to access a set of related data bits in parallel and a plurality of error detecting circuits coupled to respective ones of said recirculating data paths to detect whenever a given data path produces either a series on ones or a series of zeros upon successive accessing, the method comprising:
   reading a set of related data bits from said recirculating data paths into said accessing means;

accessing additional sets of related data bits in sequence until the end of a block of said sets of related data bits;

detecting if any of said error detecting circuits denotes a series of ones or a series of zeros having been read from corresponding recirculating data path; and transmitting said sets of related data bits from said accessing means.

8. A method according to claim 7 further including:
complementing the respective bit corresponding to the data path where an error has been noted before the transmission of data from said accessing means.

9. A method according to claim 8 further including:
setting the respective error detecting circuits to a no error condition prior to the beginning of accessing of said memory system.

* * * * *